(12) United States Patent
Sharma et al.

(10) Patent No.: US 12,473,033 B2
(45) Date of Patent: Nov. 18, 2025

(54) ROCKER PANEL TORSION LEVER

(71) Applicant: POLESTAR PERFORMANCE AB, Gothenburg (SE)

(72) Inventors: Sanjeev Sharma, Gothenburg (SE); Sushanta Debnath, Warwick (GB); Robert Lloyd, Leicestershire (GB); Aiden Austin, Leicestershire (GB)

(73) Assignee: POLESTAR PERFORMANCE AB, Gothenburg (SE)

( * ) Notice: Subject to any disclaimer, the term of this patent is extended or adjusted under 35 U.S.C. 154(b) by 178 days.

(21) Appl. No.: 17/957,656

(22) Filed: Sep. 30, 2022

(65) Prior Publication Data

US 2024/0109593 A1    Apr. 4, 2024

(51) Int. Cl.
| | | |
|---|---|---|
| *B62D 25/04* | (2006.01) | |
| *B62D 21/15* | (2006.01) | |
| *B62D 25/02* | (2006.01) | |
| *B62D 27/02* | (2006.01) | |

(52) U.S. Cl.
CPC ........... *B62D 25/04* (2013.01); *B62D 21/157* (2013.01); *B62D 25/025* (2013.01); *B62D 27/023* (2013.01)

(58) Field of Classification Search
CPC ...... B62D 25/04; B62D 25/06; B62D 25/025; B62D 21/157; B62D 27/023
USPC .................. 296/193.06, 209, 29, 30, 187.12
See application file for complete search history.

(56) References Cited

U.S. PATENT DOCUMENTS

| | | | | |
|---|---|---|---|---|
| 10,625,788 | B2 * | 4/2020 | Asa ..................... | B62D 25/025 |
| 2010/0237659 | A1 * | 9/2010 | Ishigame ............. | B62D 21/157 |
| | | | | 296/204 |
| 2016/0101814 | A1 | 4/2016 | Schnug et al. | |

FOREIGN PATENT DOCUMENTS

| | | | | |
|---|---|---|---|---|
| DE | 102005044820 A1 * | 4/2007 | ........... | B62D 25/025 |
| DE | 102008019167 A1 | 11/2009 | | |
| DE | 102017211160 B4 * | 9/2021 | ........... | B62D 21/157 |
| JP | 2008254550 A * | 10/2008 | | |
| JP | 5320218 B2 * | 10/2013 | ........... | B62D 21/157 |
| WO | 2013150209 A1 | 10/2013 | | |

OTHER PUBLICATIONS

De102005044820 text (Year: 2007).*
De102017211160 text (Year: 2021).*
Jp2008254550 text (Year: 2008).*
Jp5320218 text (Year: 2013).*
Application No. EP23200871.4, Extended European Search Report, Mailed on Mar. 7, 2024, 10 pages.

* cited by examiner

*Primary Examiner* — Dennis H Pedder
(74) *Attorney, Agent, or Firm* — Kilpatrick Townsend & Stockton LLP

(57) ABSTRACT

A vehicle rocker panel torsion lever configured to reduce intrusion in the event of a side impact, the vehicle rocker panel torsion lever including a rigid elongated member including a first end and a second end, the first end configured to be fixedly coupled to a rocker panel of a vehicle, the second end free-floating within a cavity defined by a B-pillar of the vehicle, the rigid elongated member configured to translate a linear external side-impact applied to the B-pillar to a rotational force applied to the rocker panel.

20 Claims, 9 Drawing Sheets

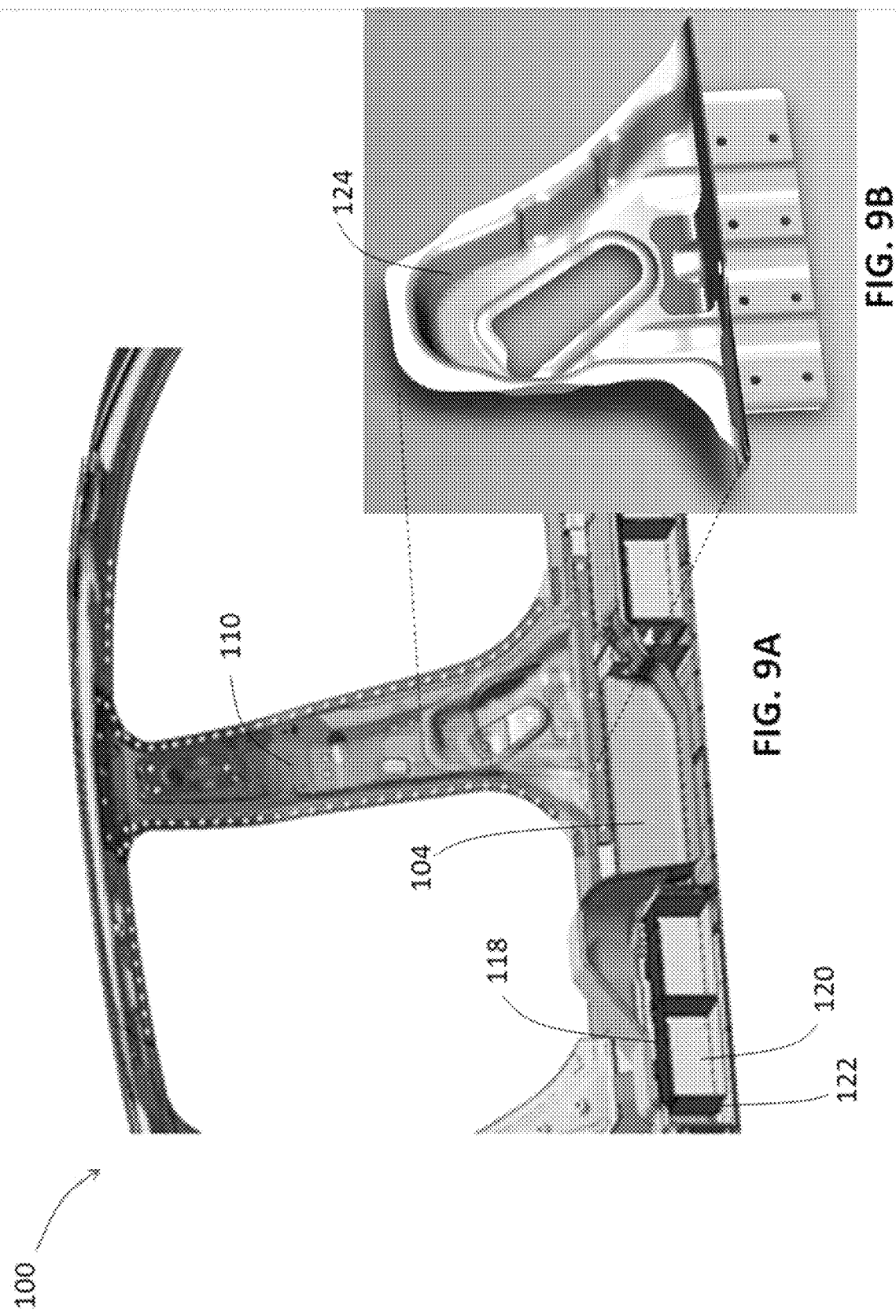

ROCKER PANEL TORSION LEVER

TECHNICAL FIELD

The present disclosure relates generally to vehicle structures, and more particularly to mechanisms for reducing occupant injury in vehicles, particularly, where a collision/impact location/point occurs above the height of the sill.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. Most rechargeable battery packs are made up of one or more battery modules, each module containing a plurality of battery cells. In many cases, the rechargeable battery packs are enclosed in a rigid enclosure or housing that is assembled to the vehicle body. For example, the rechargeable battery pack may be assembled to the vehicle body at a location that is spaced from the front, rear and sides of the vehicle, often below the passenger compartment.

The central area under the passenger compartment is an ideal location for the rechargeable battery pack because it is spaced away from the outer body of the vehicle, and is thus protected by the subfloor cross car members, rocker assemblies, and underbody side frame structures of the vehicle. This results in an elevated passenger compartment compared to traditional internal combustion engine vehicles.

Safety of the occupants of the vehicle during a crash remains highest priority, including side impact collisions. One approach has been to provide a large (e.g., 8 inches or more) collapsible member (sometimes referred to as a "crumple zone") on both sides of the floor alongside of the battery pack. Other approaches include strengthening the body structure, potentially through the addition of structural supporting beams and cross members within and around the battery enclosure. Although such advances work reasonably well for their intended purpose, these approaches add bulk and weight to the vehicle, which adversely affects fuel economy and are more focused on protection of the battery pack. In the event the vehicle is hit from the side by a taller vehicle, such as an SUV or truck, the impact often occurs above the floor and battery pack, and can cause the car to crumple into the passenger compartment. There remains a need to protect the passenger compartment from side impact collisions, without significantly adding bulk and weight.

SUMMARY OF THE DISCLOSURE

Embodiments of the present disclosure provide a cantilever torsion lever fixedly coupled to a substantially horizontal rocker panel configured to translate a substantially linear applied external side collision force into a rotational force of the rocker panel, thereby significantly reducing intrusion of portions of the vehicle into the cabin area. Accordingly, embodiments of the present disclosure present a novel device and method of dissipating side-impact energy in a manner that improves safety for occupants and decreases the likelihood of catastrophic damage to the passenger compartment or cabin area of an electric vehicle.

One embodiment of the present disclosure provides a vehicle including cantilevered lever mechanism configured to reduce intrusion in the event of a side impact including at least one rocker panel, at least one pillar defining a cavity, such as an A-pillar, B-pillar, or C-pillar, and a rigid elongated member including a first end and a second end, the first end configured to be fixedly coupled to the rocker panel of a vehicle, the second end free-floating within the cavity defined by the pillar of the vehicle, the rigid elongated member configured to translate a linear external side-impact applied to the pillar to a rotational force applied to the rocker panel.

In one embodiment, the vehicle is at least one of an all-electric vehicle, plug-in hybrid vehicle, hybrid vehicle, or vehicle with an intersection between the at least one rocker panel and the at least one pillar at a height relative to either the barrier height, the sill height, rocker height, or a combination thereof. In one embodiment the at least one pillar may be at or below 40 cm. In one embodiment, a plurality of A-pillars, B-pillars, C-pillars, or a combination thereof may be used. In one embodiment, the vehicle further includes a battery pack positioned below a passenger cabin in proximity to the at least one rocker panel. In one embodiment, the at least one pillar comprises a first component coupleable to an inside surface of the at least one rocker panel and a second component coupleable to an outside surface of the at least one rocker panel, wherein the first component and the second component define the cavity of the pillar. In one embodiment, the rigid elongated member is at least one of spot welded, bolted, screwed, riveted or adhered to the at least one rocker panel.

In one embodiment, the rigid elongated member comprises a first member and a second member. In one embodiment, first member has a trapezoidal shape with external dimensions shaped and sized to fit within a space defined by the cavity of the pillar. In another embodiment, the first member may be a non-trapezoidal shape with external dimensions shaped and sized to fit within a space defined by a cavity. In one embodiment, the first member defines a weight saving aperture. In one embodiment, the rigid elongated member is coupled to at least two surfaces of the at least one rocker panel. In one embodiment, the rigid elongated member is constructed of at least one of steel, aluminum, fiber reinforced plastic, polymer, or foam. In one embodiment, the rigid elongated member is formed by a method of at least one of forging, pressing, extruding, casting, or molding. It should be appreciated that the shape, size, dimensions, etc. of the rigid elongated member that has been described may be other shapes, sizes, dimensions, etc. besides those disclosed and may be utilized without exceeding the scope of the claimed inventions.

Another embodiment of the present disclosure provides a vehicle rocker panel torsion lever configured to reduce intrusion in the event of a side impact, including a rigid elongated member including a first end and a second end, the first end configured to be fixedly coupled to a rocker panel of a vehicle, the second end free-floating within a cavity defined by a pillar of the vehicle, the rigid elongated member configured to translate a linear external side-impact applied to the pillar to a rotational force applied to the rocker panel.

Yet another embodiment of the present disclosure provides a vehicle body configured to reduce intrusion in the event of a side impact, including a pair of rocker panels, a pair of roof rails, a pair of A-pillars positioned on a forward half of the vehicle and extending between the pair of rocker panels and a pair of roof rails, a pair of C-pillars positioned on the rear half of the vehicle and extending between the pair of rocker panels and a pair of roof rails, a pair of B-pillars positioned between the A-pillars and the C-pillars and extending between the pair of rocker panels and a pair of roof rails, and a pair of rigid elongated members, each rigid elongated member including a first end and a second end, the first end configured to be fixedly coupled to one of the rocker panels, the second end free-floating within a cavity defined by one of the B-pillars, the rigid elongated member configured to translate a linear external side-impact applied to one of the B-pillars to a rotational force applied to one of the rocker panels.

In yet another embodiment, the electrical vehicle includes only two sets of pillars, such as a two door or coupe vehicle, in which a pair of the rigid elongated members is coupled to the rocker panels and positioned within a cavity of each of the front pillars, rear pillars, or both.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 9A is a cross-sectional view of a vehicle body including a battery pack and a rocker panel torsion lever, in accordance with an embodiment of the disclosure.

FIG. 9B is a close-up, perspective view of the rocker panel torsion lever of FIG. 9A, in accordance with an embodiment of the disclosure.

Figure 1:
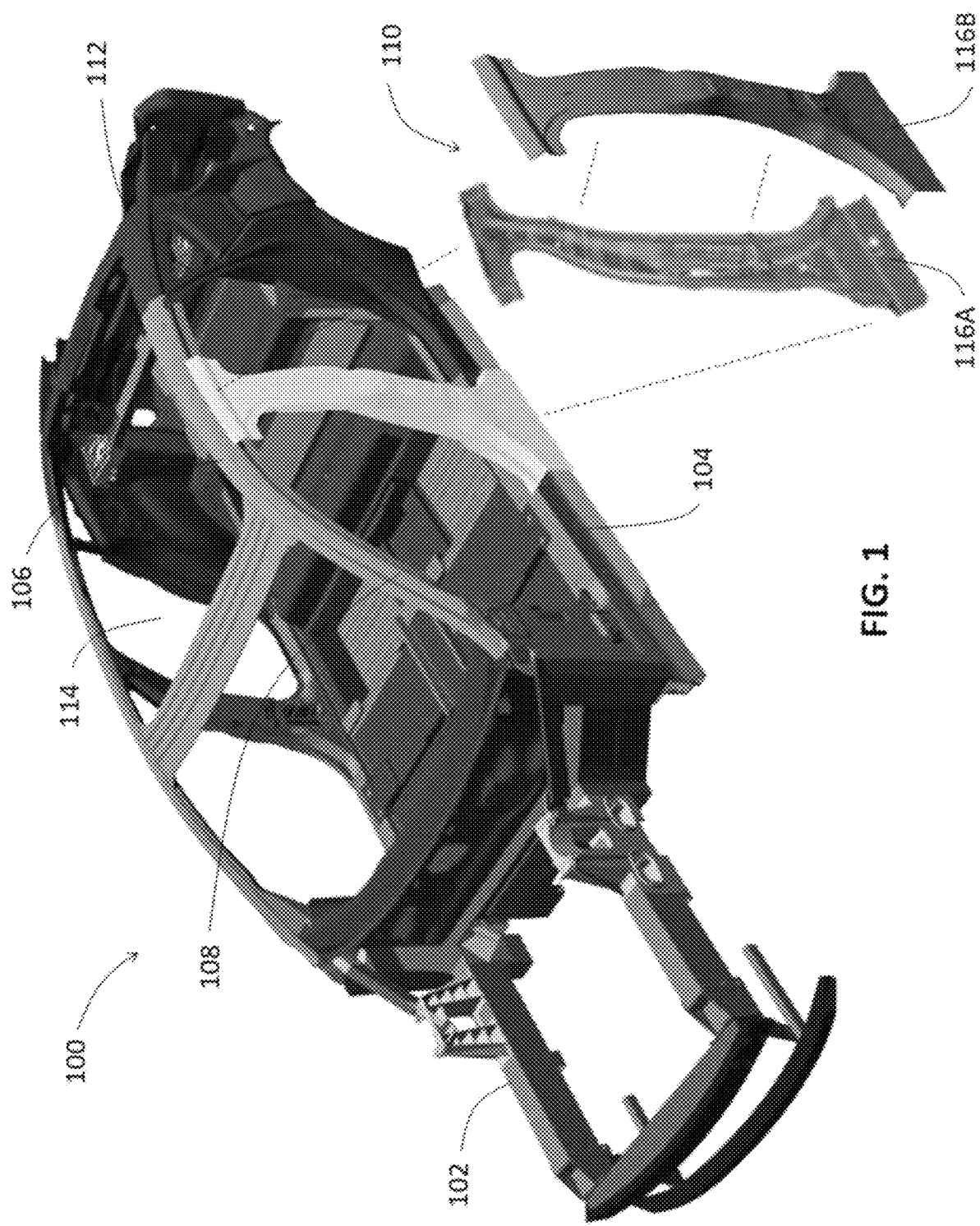
FIG. 1 is a perspective view depicting a vehicle body, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1 depicts a portion of a vehicle 100 including a vehicle body 102, in accordance with an embodiment of the disclosure. The vehicle body 102 can include rocker panels 104 (occasionally referred to herein as a "sill") spaced apart from roof rails 106. A plurality of pillars 108, 110, 112 can extend between the rocker panels 104 and the roof rails 106. In some non-limiting embodiments, the plurality of pillars can include A-pillars 108, B-pillars 110, and C-pillars 112. The A-pillars 108 can be spaced from one another and partially define an opening for a front windshield. The A-pillars 108, the B-pillars 110, the rocker panels 104, and the roof rails 106 can define an opening for a front door. The B-pillars 110, the C-pillars 112, the rocker panels 104, and the roof rails 106 can define an opening for a rear door.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower,", etc. are generally described herein with reference to the drawings in the usual gravitational frame of reference, in which the vehicle body 102 is described as a three-dimensional structure having an outer surface and an inner surface defining an interior space 114, regardless of how the components may be oriented.

As depicted, in some embodiments, the B-pillar 110 can comprise an assembly including a first component 116A configured to be fixedly coupled to an inside surface of the rocker panel 104 and inside surface of the roof rail 106, and a second component 116B fixedly coupled to an outside surface of the rocker panel 104 and an outside surface of the roof rail 106, such that the first and second component 116A/B combined to form a complete B-pillar 110. For example, in some embodiments, the first and second components 116A/B can be spot welded, riveted, adhesively bonded or otherwise permanently affixed to the rocker panels 104, roof rails 106, or other components of the vehicle body 102, thereby forming an integral vehicle frame with sufficient rigidity and impact absorption attributes to protect vehicle occupants and motive components of the vehicle in the event of a side impact.

Figure 2B:
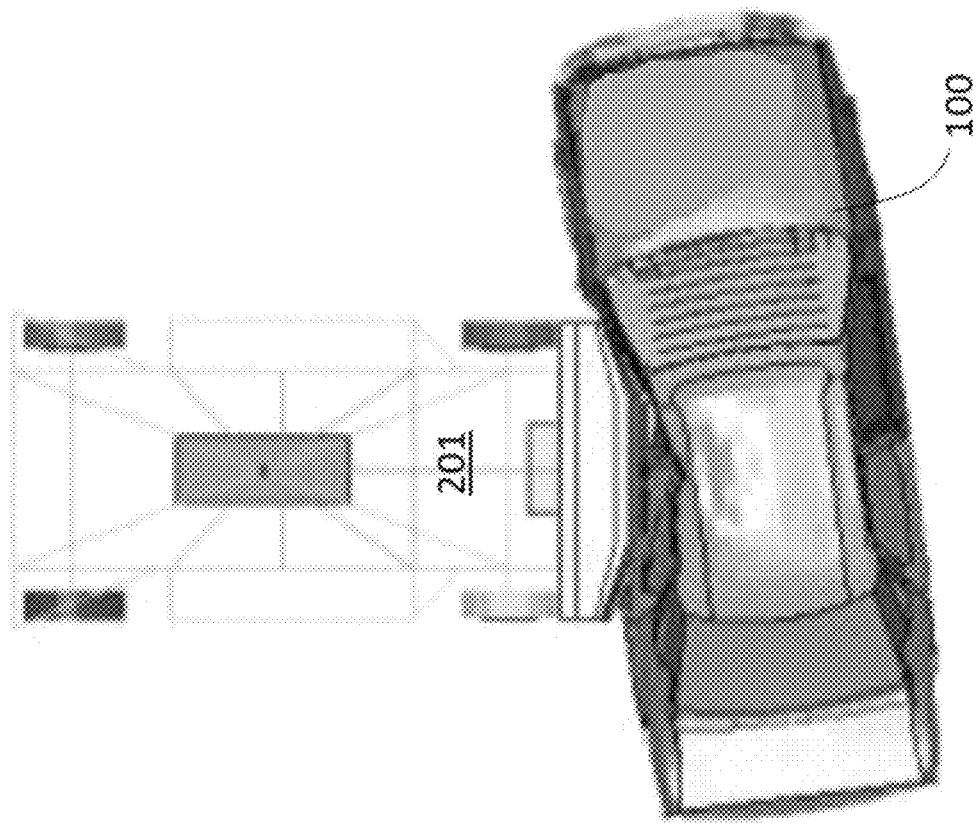
FIG. 2B depicts the vehicle of FIG. 2A after the side-impact, in accordance with an embodiment of the disclosure.
Figure 2A:
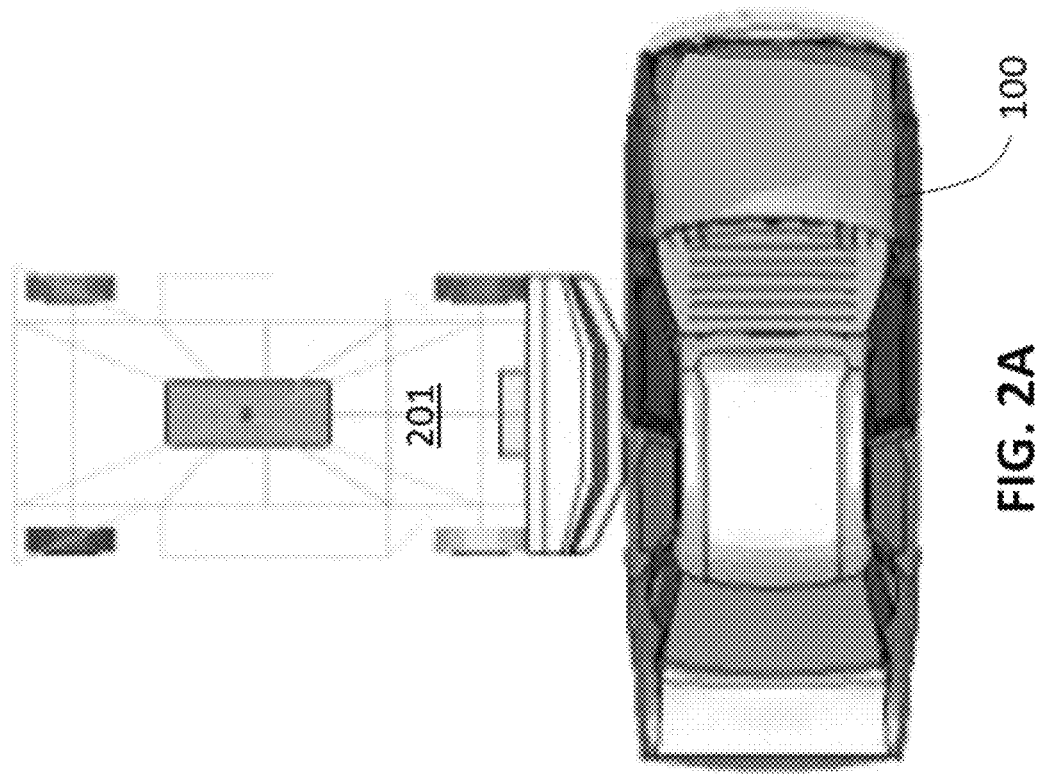
FIG. 2A is a top view depicting a vehicle prior to a side-impact, in accordance with an embodiment of the disclosure.
Figure 3B:
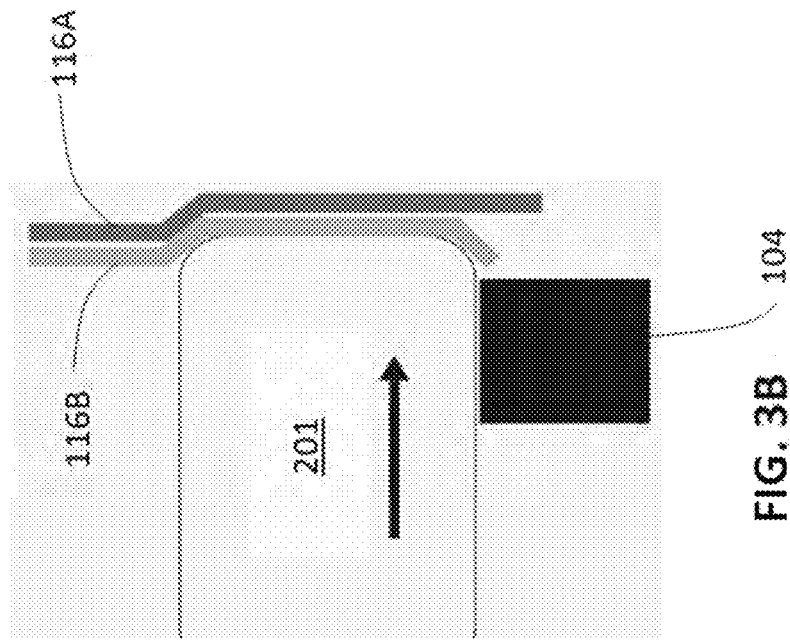
FIG. 3B depicts the vehicle body of FIG. 3A after the side-impact, in accordance with an embodiment of the disclosure.
Figure 3A:
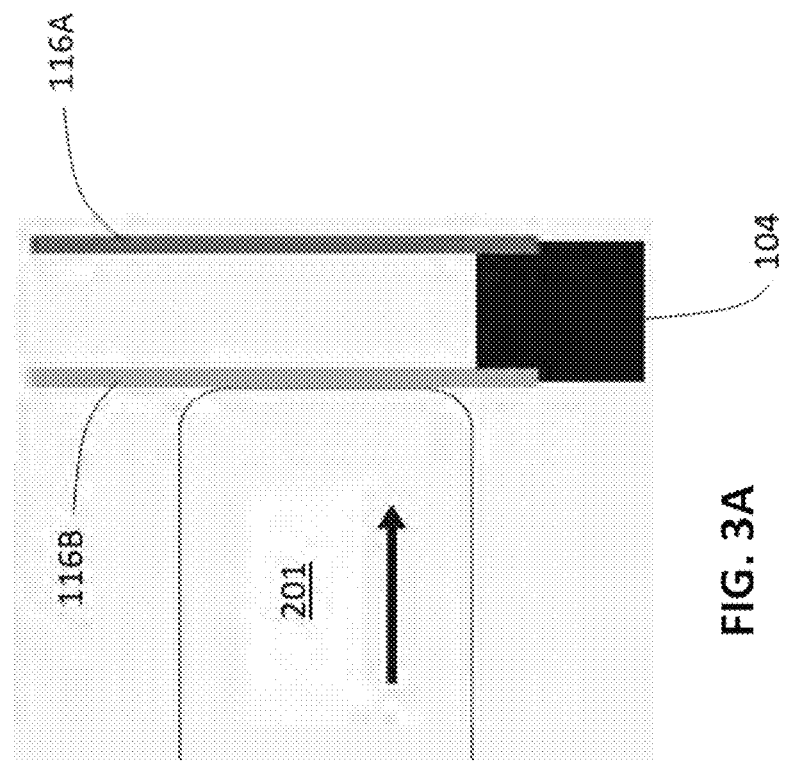
FIG. 3A is a cross-sectional view depicting a vehicle body prior to a side-impact, in accordance with an embodiment of the disclosure.

With additional reference to FIGS. 2A-B, before and after views of a vehicle 100 subjected to a side impact are depicted in accordance with an embodiment of the disclosure. As depicted, in some instances, the side impact can result in a significant intrusion into an interior space 114 defined by the vehicle body 102. For example, with further reference to FIGS. 3A-B, cross-sectional views of a B-pillar 110 subjected to a side impact are depicted in accordance with an embodiment of the disclosure. In some instances, the external force applied during a side impact (e.g., via another vehicle, barrier or other impacting object 201) may occur above the rocker panel 104, on a lower portion of the B-pillar 110. As a non-limiting example, lower sitting vehicles are more likely susceptible to this type of impact (e.g., saloons, estates, crossovers, sports cars etc.), where the impacting object 201 is at a height vertically above the sill or rocker panel 104.

In instances where the side-impact force is applied vertically between the rocker panel 104 and the roof rail 106, and horizontally between the A-pillar 108 and the C-pillar 110, the second component 116B of the B-pillar 110, which is positioned on an outer surface of the frame, can be torn free or otherwise deformed or partially separated from the rocker panel 104 and shifted inwardly toward the interior first panel 116A. If the external force is sufficient, the first panel 116A can also be deformed or separated from the rocker panel 104 to be pushed inwardly to intrude into an interior space 114 defined by the vehicle body 102.

Figure 4:
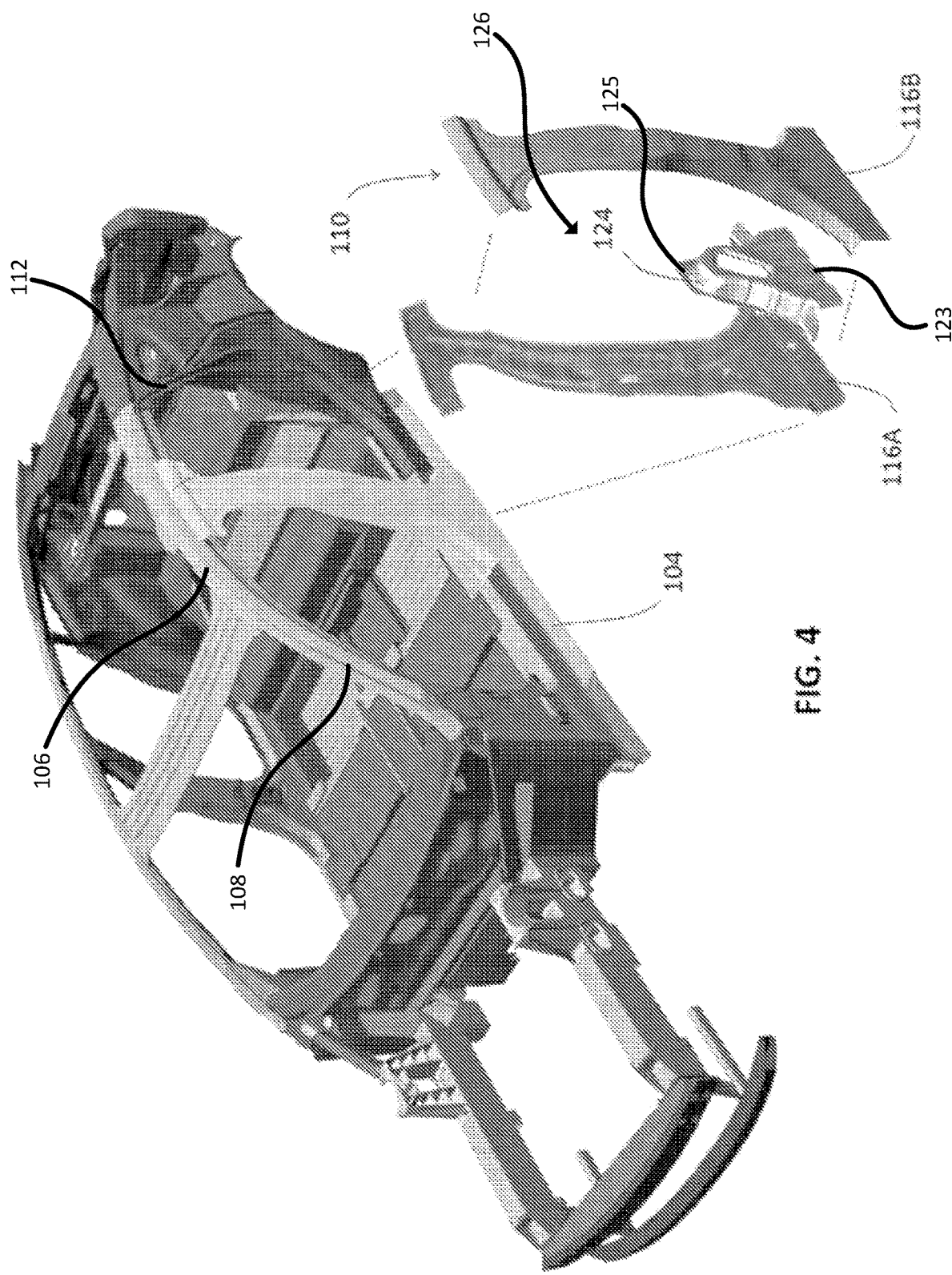
FIG. 4 is a perspective view depicting a vehicle body including a rocker panel torsion lever, in accordance with an embodiment of the disclosure.

In some embodiments, one or more mechanisms configured to deflect an external force applied from a side-impact can be employed to reduce damage to the cabin of an electric vehicle 100. For example, with reference to FIG. 4, in some embodiments, a rocker panel torsion member 124 (occasionally referred to herein as a "fence post") can be positioned between the first and second components 116A/B of the B-pillar 110. In embodiments, the rocker panel torsion member 124 can be fixedly coupled to the rocker panel 104 as a cantilever extension. For example, in some embodiments, a first end 123 of the rocker panel torsion member 124 can be spot welded, bolted, screwed, riveted, adhered or otherwise permanently coupled to the rocker panel 104. In embodiments, it is not necessary that the rocker panel torsion member 124 be physically coupled to components of the B-pillar 110; rather, in some embodiments, a second end 125 of the rocker panel torsion member 124 resides within an interior space 126 (as depicted in FIG. 5A-B) defined between the first and second components 116A/B of the B-pillar 110, without being physically coupled directly to the B-pillar 110.

Figure 5B:
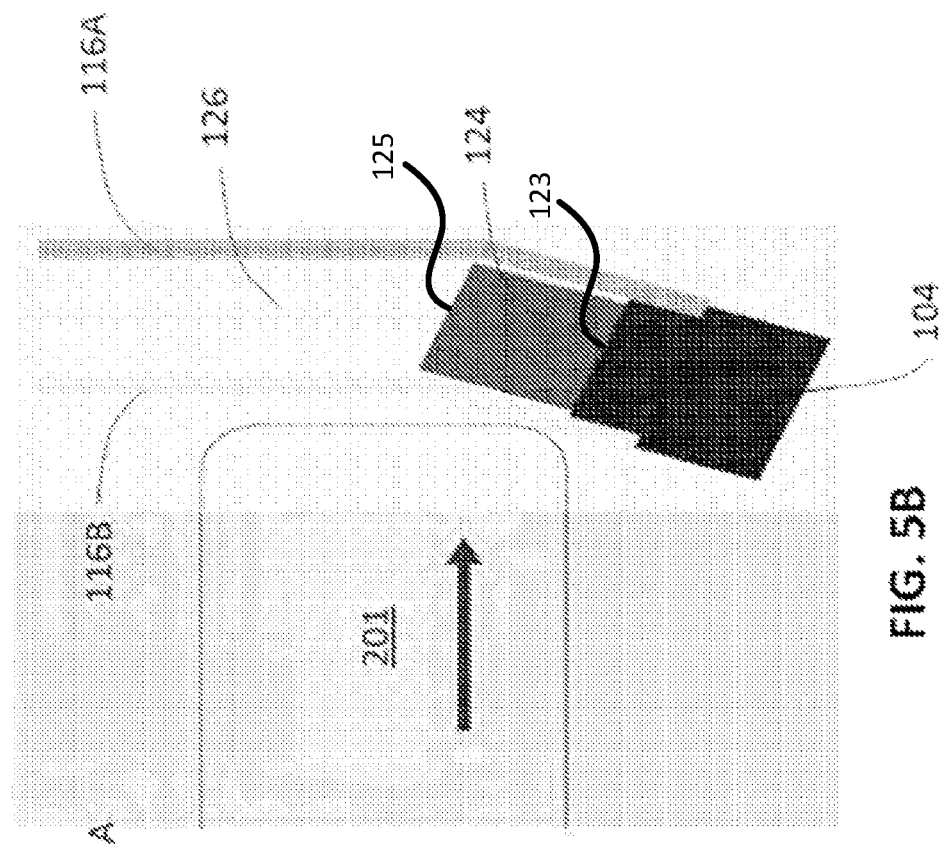
FIG. 5B depicts the vehicle body of FIG. 5A after the side-impact, in accordance with an embodiment of the disclosure.
Figure 5A:
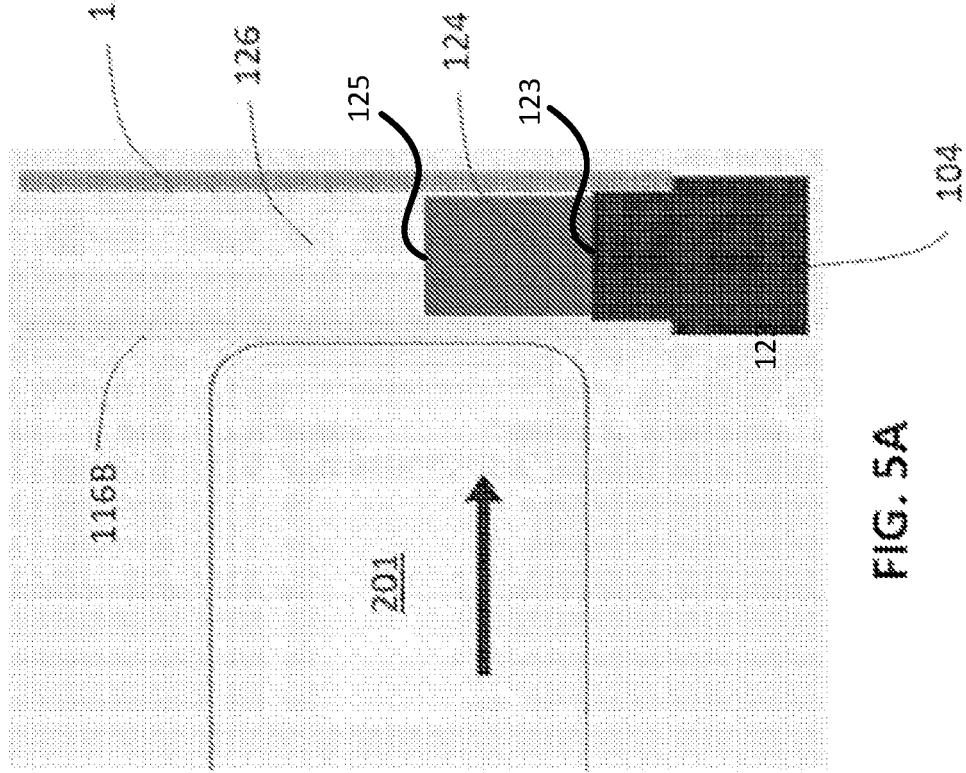
FIG. 5A is a cross-sectional view depicting a vehicle body including a rocker panel torsion lever prior to a side-impact, in accordance with an embodiment of the disclosure.

With additional reference to FIG. 5A-B, before and after cross sectional views of a vehicle body 102 including a rocker panel torsion member 124 subjected to a side-impact are depicted in accordance with an embodiment of the disclosure. As depicted, the rocker panel torsion member 124 has the effect of translating the external force applied by the side-impact object 201 into a rotational force of the rocker panel 104. Specifically, the rocker panel torsion member 124, which is physically coupled to the rocker panel 104 as a cantilevered beam, acts as a lever to convert the linear external force to a rotational force in a manner that significantly reduces intrusion into the interior space 114 defined by the vehicle body 102.

Accordingly, embodiments of the present disclosure enable a side-impact force applied to the vehicle body 102 vertically between the rocker panel 104 and the roof rail 106, and horizontally between the A-pillar 108 and the C-pillar 112 to be dissipated through torsional bending of the rocker panel 104, as opposed to bending and/or separation of the B-pillar 110 inwardly towards the interior space 114 defined by the vehicle body 102. Such an advantage can both offer increased protection to occupants of the vehicle, as well as significantly reduce the likelihood of damage to the battery pack 118 of an electric vehicle 100.

Figure 6:
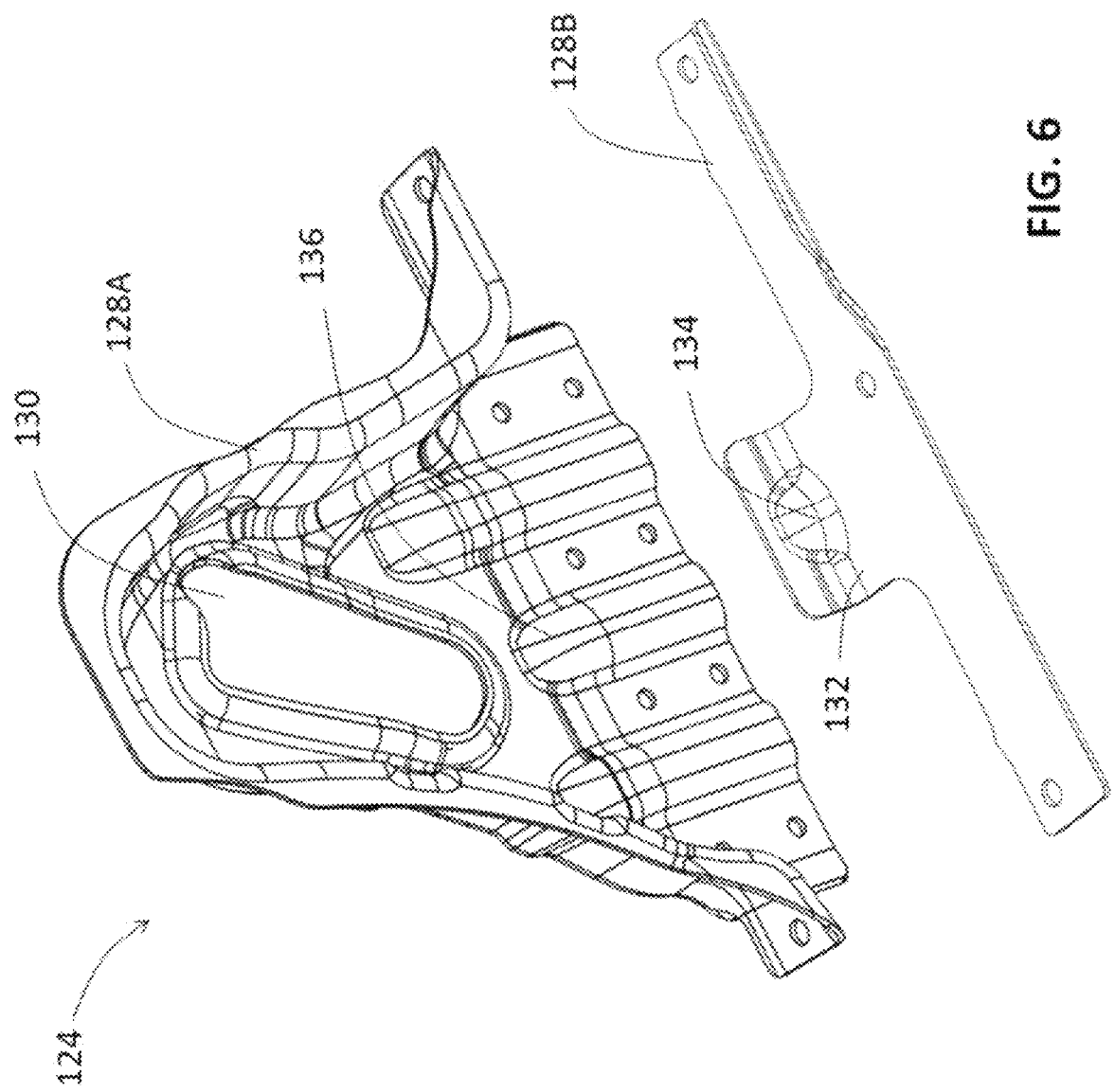
FIG. 6 is an exploded, perspective view depicting a rocker panel torsion lever, in accordance with an embodiment of the disclosure.
Figure 7:
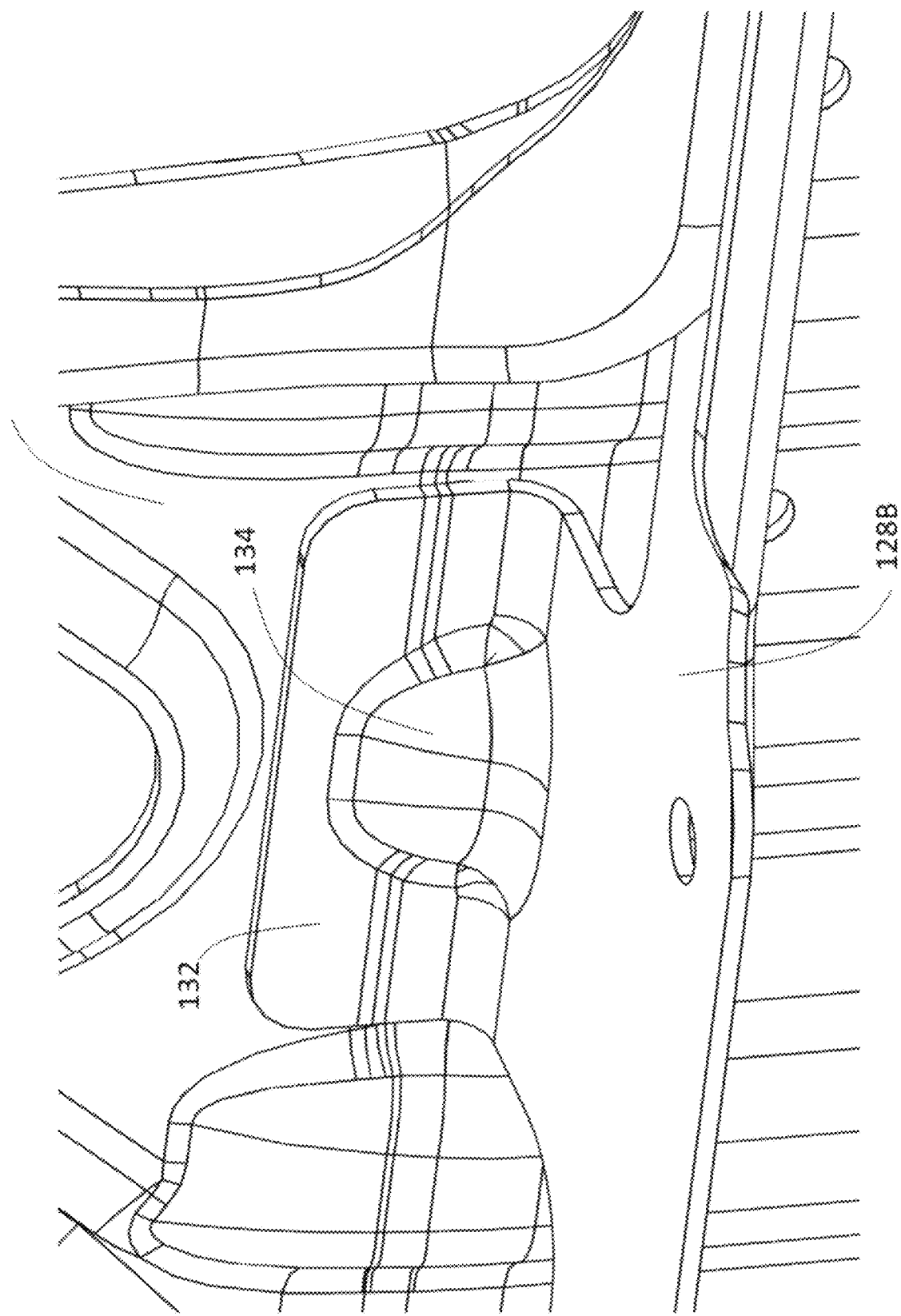
FIG. 7 is a close-up, perspective view depicting a rocker panel torsion lever, in accordance with an embodiment of the disclosure.
Figure 8:
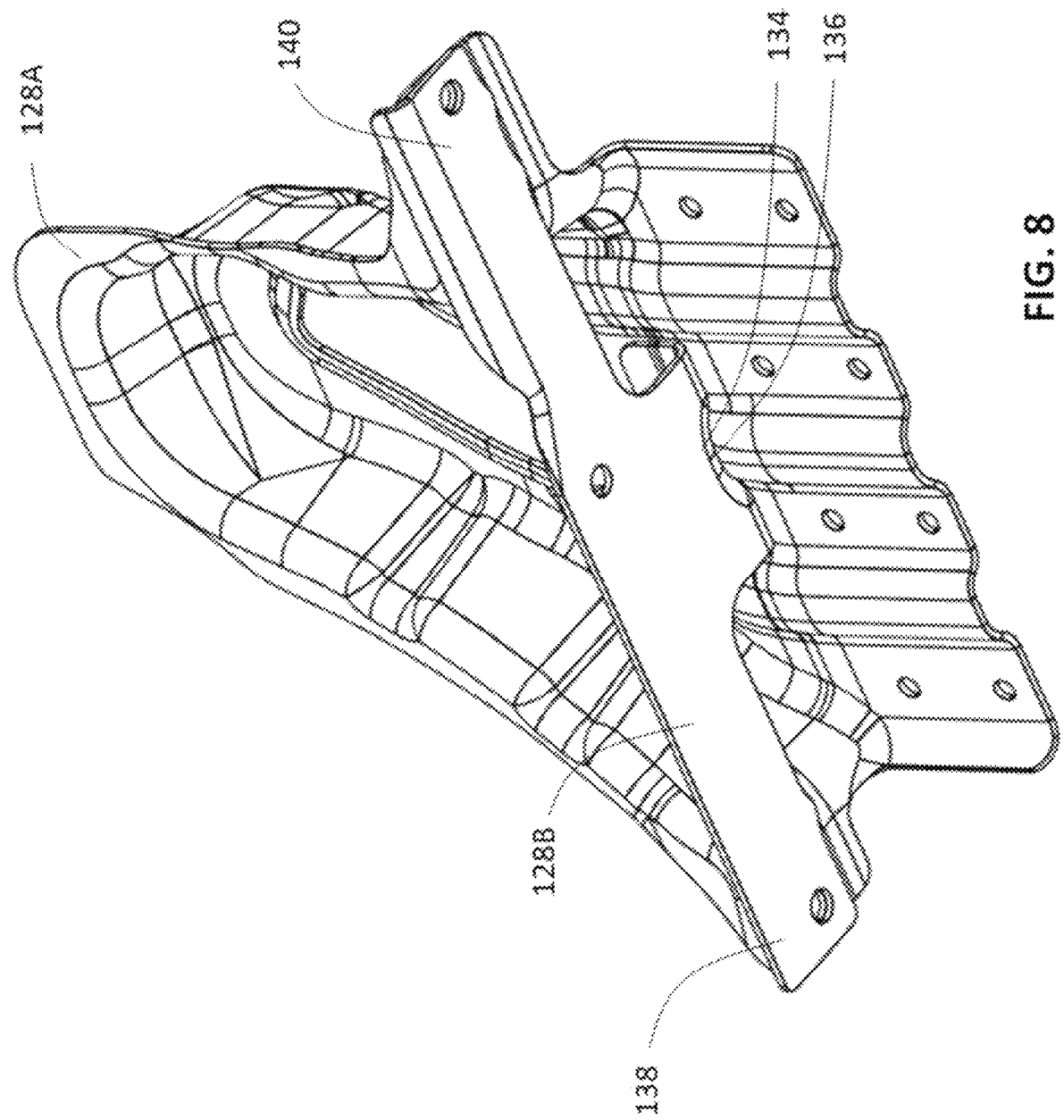
FIG. 8 is a perspective view depicting an assembled rocker panel torsion lever, in accordance with an embodiment of the disclosure.

With additional reference to FIGS. 6-8, in some embodiments, the rocker panel torsion member 124 can comprise a first substantially rigid member 128A and a second substantially rigid member 128B. In some embodiments, the first member 128A can be generally configured to be fixedly coupled to an exterior vertical surface of a rocker panel 104, while the second member 128B can generally be configured to be fixedly coupled to a top horizontal surface of the rocker panel 104.

For example, in some embodiments, the first and second members 128A/B of the rocker panel torsion member 124 can be spot welded, bolted, screwed, riveted, or adhered to at least two surfaces of the rocker panel 104; although other methods of fixedly coupling the rocker panel torsion member 124 to the rocker panel 104 are also contemplated. Accordingly, in some embodiments, the rocker panel torsion member 124 is coupled to two surfaces of the rocker panel 104 in order to enable more effective transfer of a bending force to the rocker panel 104.

It should be appreciated that the rocker panel torsion member 124, while being described as comprising a first substantially rigid member 128A and a second substantially rigid member 128B, may be of one, single piece. Said rocker panel torsion member configured to be fixedly coupled to the exterior vertical surface of the rocker panel 104, the sill, or both.

In embodiments, the rocker panel torsion member 124 can be constructed of a variety of materials, including, but not limited to, steel, aluminum, fiber reinforced plastic (FRP), polymers, foams, and the like. The rocker panel torsion member 124 can be formed according to a variety of methods including forged, pressed, extruded, cast, molded, or the like.

In embodiments, the first member 128A can generally be trapezoidal in shape, wherein the external dimensions of the first member 128A are generally configured to fit within a space defined between the first and second components 116A/B of the B-pillar 110, such that the first member 128A is generally freestanding relative to the B-pillar 110. In one embodiment, the first member may be a non-trapezoidal shape with external dimensions shaped and sized to fit within a space defined by a cavity. In some embodiments, the first member 128A can define one or more apertures 130 configured to reduce and overall weight of the rocker panel torsion member 124 without significantly sacrificing rigidity or the ability to act as a lever for the conversion of a linear force to a bending moment. It should be appreciated that the shape, size, dimensions, etc. of the rigid elongated member that has been described may be other shapes, sizes, dimensions, etc. besides those disclosed and may be utilized without exceeding the scope of the claimed inventions. The second member 128B can generally be configured as a linear bar configured to be fixedly coupled to a surface of the rocker panel. In some embodiments, the second member 118 can include a tab 132 defining a feature 134 conformed to interlock with a corresponding feature 136 of the first member 128A, thereby aiding in the attachment of the first member 128A to the second member 128B to form a unitary rocker panel torsion member 124. In some embodiments, the first member 128A and the second member 128B can be coupled together at three or more distinct coupling point, including a first coupling point 138, second coupling point 140, and features 134/136. Other configurations of coupling the first member 128A to the second member 128B are also contemplated. It should be appreciated that the rocker panel torsion member 124, while being described as comprising a first substantially rigid member 128A and a second substantially rigid member 128B, may be of one, single piece. Said rocker panel torsion member configured to be fixedly coupled to the exterior vertical surface of the rocker panel 104, the sill, or both.

With additional reference to FIGS. 9A-B, operably coupling the of the rocker panel torsion member 124 to the rocker panel 104, within the B-pillar 110 enables the conversion of a substantially linear applied external force to be translated into a bending and/or torsion movement of the rocker panel 104, thereby significantly reducing intrusion of portions of the vehicle body (e.g., portions of the rocker panel 104, B-pillar 110, etc.) into an interior space 114 defined by the vehicle body 102. Accordingly, embodiments of the present disclosure are configured to enable greater preservation of the cabin area, as well as to inhibit damage to a battery pack in the event of a side impact, thereby significantly reducing the risk of a thermal runaway.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A vehicle including cantilevered lever mechanism configured to reduce intrusion in the event of a side impact, the vehicle comprising:
    at least one rocker panel;
    a pillar including structure defining a cavity; and
    an elongated member being coupled to the at least one rocker panel as a cantilevered beam, the elongated member including a first end and a second end, the first end configured to be fixedly coupled to the rocker panel of the vehicle, the second end free-floating within the cavity defined by the pillar of the vehicle, the elongated member configured to translate a linear external side-impact applied to the pillar to a rotational force applied to the rocker panel, wherein the pillar comprises a first component coupleable to an inside surface of the at least one rocker panel and an inside surface of a component of a vehicle body, and a second component coupleable to an outside surface of the at least one rocker panel and an outside surface of the component of the vehicle body, wherein the first component and the second component define the cavity of the pillar, wherein the elongated member is a rocker panel torsion member, wherein said elongated member comprises at least a first member, wherein the first member is fixedly coupled to an exterior vertical surface of the at least one rocker panel at a first end, wherein the first member extends vertically from said exterior vertical surface of the at least one rocker panel,
    wherein external dimensions of a second end of the first member are located within a space defined in the second component of the pillar, wherein the first member is one single piece.

2. The vehicle of claim 1, further comprising a battery pack positioned below a passenger cabin in proximity to the at least one rocker panel.

3. The vehicle of claim 1, wherein the pillar comprises a first component coupleable to an inside surface of the at least one rocker panel and a second component coupleable to an outside surface of the at least one rocker panel, wherein the first component and the second component define the cavity of the pillar.

4. The vehicle of claim 1, wherein the elongated member is at least one of spot welded, bolted, screwed, riveted or adhered to the at least one rocker panel.

5. The vehicle of claim 1, wherein elongated member comprises a first member and a second member.

6. The vehicle of claim 5, wherein at least a portion of the elongated member has a shape with external dimensions shaped and sized to fit within a space defined by the cavity of the pillar.

7. The vehicle of claim 6, wherein the first member has a trapezoidal shape.

8. The vehicle of claim 1, wherein the elongated member is coupled to at least two surfaces of the at least one rocker panel.

9. The vehicle of claim 1, wherein the elongated member is constructed of at least one of steel, aluminum, fiber reinforced plastic, polymer, or foam.

10. The vehicle of claim 1, wherein the elongated member is formed by a method of at least one of forging, pressing, extruding, casting, or molding.

11. A vehicle rocker panel torsion lever configured to reduce intrusion in the event of a side impact, the vehicle rocker panel torsion lever comprising:
    an elongated member including a first end and a second end, the first end configured to be fixedly coupled to a rocker panel of a vehicle as a cantilevered beam, the second end free-floating within a cavity defined by a pillar of the vehicle, the elongated member configured to translate a linear external side-impact applied to the pillar to a rotational force applied to the rocker panel, wherein the pillar comprises a first component coupleable to an inside surface of the rocker panel and an inside surface of a component of a vehicle body, and a second component coupleable to an outside surface of the rocker panel and an outside surface of the component of the vehicle body, wherein the first component and the second component define the cavity of the pillar, wherein the elongated member is a rocker panel torsion member, wherein said elongated member comprises at least a first member, wherein the first member is configured to be fixedly coupled to an exterior vertical surface of the rocker panel at a first end, wherein the first member is arranged to extend vertically from said exterior vertical surface of the rocker panel, wherein external dimensions of a second end of the first member are configured to be located within a space defined in the second component of the pillar, wherein the first member is one single piece.

12. The vehicle rocker panel torsion lever of claim 11, wherein at least a portion of the elongated member has a shape with external dimensions shaped and sized to fit within a space defined by the cavity of the pillar.

13. The vehicle rocker panel torsion lever of claim 12, wherein at least a portion of the elongated member has a trapezoidal shape.

14. The vehicle rocker panel torsion lever of claim 11, wherein the elongated member comprises a first member which defines a weight saving aperture.

15. The vehicle rocker panel torsion lever of claim 12, wherein the elongated member comprises a first member and a second member which are coupled together by at least three distinct coupling points.

16. The vehicle rocker panel torsion lever of claim 11, wherein the elongated member is configured to be coupled to at least two surfaces of the rocker panel.

17. The vehicle rocker panel torsion lever of claim 11, wherein the elongated member is constructed of at least one of steel, aluminum, fiber reinforced plastic, polymer, or foam.

18. The vehicle rocker panel torsion lever of claim 11, wherein the elongated member is formed by a method of at least one of forging, pressing, extruding, casting, or molding.

19. A vehicle body configured to reduce intrusion in the event of a side impact, the vehicle body comprising:
   a pair of rocker panels;
   a pair of components;
   a pillar structure comprising:
      a first pair of pillars positioned on a forward half of the vehicle and extending between the pair of rocker panels and the pair of components;
      a second pair of pillars positioned on a rear half of the vehicle and extending between the pair of rocker panels and the pair of components;
      a third pair of pillars positioned between the first pair of pillars and the third pair of pillars and extending between the pair of rocker panels and the pair of components of; and
   a pair of elongated members, each elongated member including a first end and a second end, the first end configured to be fixedly coupled to a first rocker panel of the rocker panels, the second end free-floating within a cavity defined by the pillar structure, the elongated member being coupled to first rocker panel as a cantilevered beam, the elongated member is configured to translate a linear external side-impact applied to the pillar structure having the cavity defined therein to a rotational force applied to the first rocker panel, wherein the pillar structure comprises a first component coupleable to an inside surface of the first rocker panel and an inside surface of the component of the vehicle body, and a second component coupleable to an outside surface of the first rocker panel and an outside surface of the component of the vehicle body, wherein the first component and the second component define the cavity of the pillar structure, wherein the elongated member is a rocker panel torsion member, wherein the elongated member comprises at least a first member, wherein the first member is fixedly coupled to an exterior vertical surface of the first rocker panel at a first end, wherein the first member extend vertically from said exterior vertical surface of the first rocker panel, wherein external dimensions of a second end of the first member are located within a space defined in the second component of the pillar structure, wherein the first member is one single piece.

20. The vehicle of claim 1, wherein the elongated member further comprises a second member, the second member comprising a linear bar configured to be supported by a horizontal surface of the first rocker panel, wherein the second member and said first member are in one-piece, or the second member is fixedly coupled to said first member.

* * * * *